United States Patent
Nam

[19]
[11] Patent Number: 5,815,290
[45] Date of Patent: Sep. 29, 1998

[54] GUIDE APPARATUS OF CONTACT IMAGE SENSOR

[75] Inventor: Dong-Soo Nam, Gumi-City, Rep. of Korea

[73] Assignee: SamSung Electronics Co., Ltd., Suwon, Rep. of Korea

[21] Appl. No.: 697,946

[22] Filed: Sep. 3, 1996

[30] Foreign Application Priority Data

Aug. 31, 1995 [KR] Rep. of Korea .................. 1995 28396

[51] Int. Cl.⁶ ............................. H04N 1/04; H01L 27/00; F16M 11/00
[52] U.S. Cl. ......................... 358/498; 358/474; 358/482; 358/483; 358/497; 250/208.1; 248/201
[58] Field of Search ..................................... 358/473, 474, 358/482, 483, 496, 497, 498, 488, 296; 382/312, 313, 314, 315; 250/208.1, 239; 248/201

[56] References Cited

U.S. PATENT DOCUMENTS

| | | |
|---|---|---|
| 3,833,771 | 9/1974 | Collinson . |
| 4,237,597 | 12/1980 | Auger . |
| 4,385,325 | 5/1983 | Chen . |
| 4,581,657 | 4/1986 | Takano . |
| 4,729,036 | 3/1988 | Ikeda et al. . |
| 4,774,116 | 9/1988 | Hart . |
| 4,865,265 | 9/1989 | Hashizume et al. . |
| 5,120,079 | 6/1992 | Boggs . |
| 5,142,137 | 8/1992 | Kushino et al. . |
| 5,212,376 | 5/1993 | Liang ................................... 250/208.1 |
| 5,278,677 | 1/1994 | Lee et al. ............................... 358/498 |

*Primary Examiner*—Edward L. Coles, Sr.
*Assistant Examiner*—Mark Wallerson
*Attorney, Agent, or Firm*—Robert E. Bushnell, Esq.

[57] ABSTRACT

A guide apparatus of a contact image sensor, which facilitates the affixing of the contact image sensor to the guide apparatus, includes: a guide rib in a form of a rectangle having one open side; a fixing projection at the inner center of the rib; and a hole disposed in the center of the rib so as to be separated from the fixing projection; the contact image sensor including two holes on a side surface thereof so as to be separated apart from each other, the side surface of the contact image sensor being engaged into the inner portion of the guide rib, the fixing projection being engaged into one of the two holes on the side surface of the contact image sensor, the hole of the guide apparatus being immediately adjacent to the other of the two holes on the side surface of the contact image sensor, so that the guide apparatus and the contact image sensor are fixedly assembled by a fastener engaging the other of the holes on the side surface of the contact image sensor after passing through the hole in the guide apparatus.

4 Claims, 3 Drawing Sheets

GUIDE APPARATUS OF CONTACT IMAGE SENSOR

CLAIM FOR PRIORITY

This application make reference to, incorporates the same herein, and claims all benefits accruing under 35 U.S.C § 119 from an application entitled GUIDE APPARATUS OF CONTACT IMAGE SENSOR earlier filed in the Korean Industrial Property Office on 31 Aug. 1995 and assigned Korean Application No. 28396/1995.

BACKGROUND OF THE INVENTION

1. Field of the Invention

The present invention relates to a guide apparatus of a contact image sensor, and more particularly to a guide apparatus of a contact image sensor for use in a facsimile machine.

2. Description of the Related Art

A contact image sensor generally utilized for a facsimile machine serves to recognize transmission data to enable the facsimile machine to transmit it to a counterpart machine or to duplicate it. The contact image sensor can perform a corresponding function at a prescribed position of its structure for transferring data by using a guide apparatus which is an additional apparatus.

In earlier guide apparatus, bolt holes are formed on both sides of a contact image sensor so as to be spaced apart from each other and holes corresponding to the bolt holes are formed in each of the pair of guide apparatus for fixing them to the contact image sensor. An auxiliary position fixing apparatus is employed to force the bolt holes formed on the sides of the contact image sensor to correspond to the holes formed in the pair of guide apparatus and bolts are screwed to the bolt holes of the contact image sensor via the holes of the guide apparatus. Thereafter, the guide apparatus on both sides of the contact image sensor are fixed to the inside of the main body of the facsimile machine for enabling the operation of the contact image sensor.

The contact image sensor and the guide apparatus must be joined to each other by means of numerous bolts, or other threaded fasteners, that are inserted during manufacturing assembly, through the bolt holes of the contact image sensor and the holes of the guide apparatus. For their accurate joining, the auxiliary position fixing apparatus must be utilized to secure their positions prior to their joining. In the earlier apparatus for affixing the contact image sensor to the guide apparatus, however, the auxiliary position-fixing apparatus is used for the accurate mating of the contact image sensor and guide apparatus to make the holes in the separated places of the guide apparatus correspond to the bolt holes in the separated places of both sides of the contact image sensor. This requires as many bolts as the holes, inconveniencing its assembling. The sheer number of threaded fasteners, as well as the need to accurately position the guide during assembly is, I have found, time consuming as well as a source of manufacturing error.

The Lee, et al. patent, U.S. Pat. No. 5,278,677 entitled Device For Removing Document Jamming Generated At A Transmitter Of A Facsimile Using A Contact Image Sensor, illustrates in FIG. 2 thereof one version of a typical earlier guide apparatus are affixed to a contact image sensor as noted above. A different design is shown by the Kushino et al. patent, U.S. Pat. No. 5,142,137 entitled Image Sensor Having Clamp Connecting Sensing And Driving Components, discloses the use of a spring type clamp arrangement to affix the image sensor to a guide apparatus in a facsimile machine. The Hashizume, et al. patent, U.S. Pat. No. 4,865,265 entitled Magnetic Tape Cassette, is cited as showing that the use of a combination of guide pins and screws generally, albeit in a unique configuration, for a specialized use.

I have found that the designs provided by these references unnecessarily require specific recited features using too many parts to be accurately assembled during manufacture.

SUMMARY OF THE INVENTION

The present invention is devised to solve the above-described problems. It is therefore, one object to provide an improved guide for a contact image sensor in image formation devices.

It is another object of the present invention to provide a guide apparatus of a contact image sensor, which facilitates the assembling of the contact image sensor and guide apparatus.

It is yet another object to provide a guide for a contact image sensor that is simplified in structure and number of parts, and that facilitates assembly of image formation and telecommunication equipment.

It is still another object of the present invention to provide a guide apparatus of a contact image sensor that minimizes occurrences of manufacturing error by reducing the number of assembling elements to allow for an easy and fast assembly when the contact image sensor is combined with the guide apparatus.

The above noted objects may be effected by providing a guide apparatus affixed to a contact image sensor, the guide apparatus with: a guide rib in a form of a rectangle having one open side; a projection at an inner center of said rib; and a hole disposed in the inner center of the rib so as to be separated from the projection. The contact image sensor includes two holes on a side surface so as to be spaced apart from each other. The side surface of the contact image sensor is engaged with an inner portion of the guide rib. The projection is engaged with one of the two holes of the side surface of the contact image sensor, and the hole of the guide rib being immediately adjacent to the other of the holes on the side surface of the contact image sensor, so that the guide apparatus and the contact image sensor are securely assembled by a fastener engaging the other of the holes on the side surface of the contact image sensor after passing through the hole in the guide apparatus.

The above noted objects may also be effected by providing a guide apparatus attached to a side portion of an element. The guide apparatus may be constructed with a guide rib having a form so as to partially enclose the side portion of the element, a projection at an inner center of the rib, and a hole disposed in the inner center of the rib so as to be separated from the projection. The element includes two holes on the side portion surface so as to be separated apart from each other. The side surface of the element is engaged with an inner portion of the guide rib, the projection is engaged with one of the two holes of the side surface of the element, and the hole of the guide rib is immediately adjacent to the other of the two holes on the side surface of the element, so that the guide apparatus and the element are securely assembled with a fastener engaging the other of the holes on the side surface of the element after passing through the hole in the guide apparatus.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

A preferred embodiment of a guide apparatus of a contact image sensor according to the present invention will be described in detail with reference to the accompanying drawings.

Figure 1:
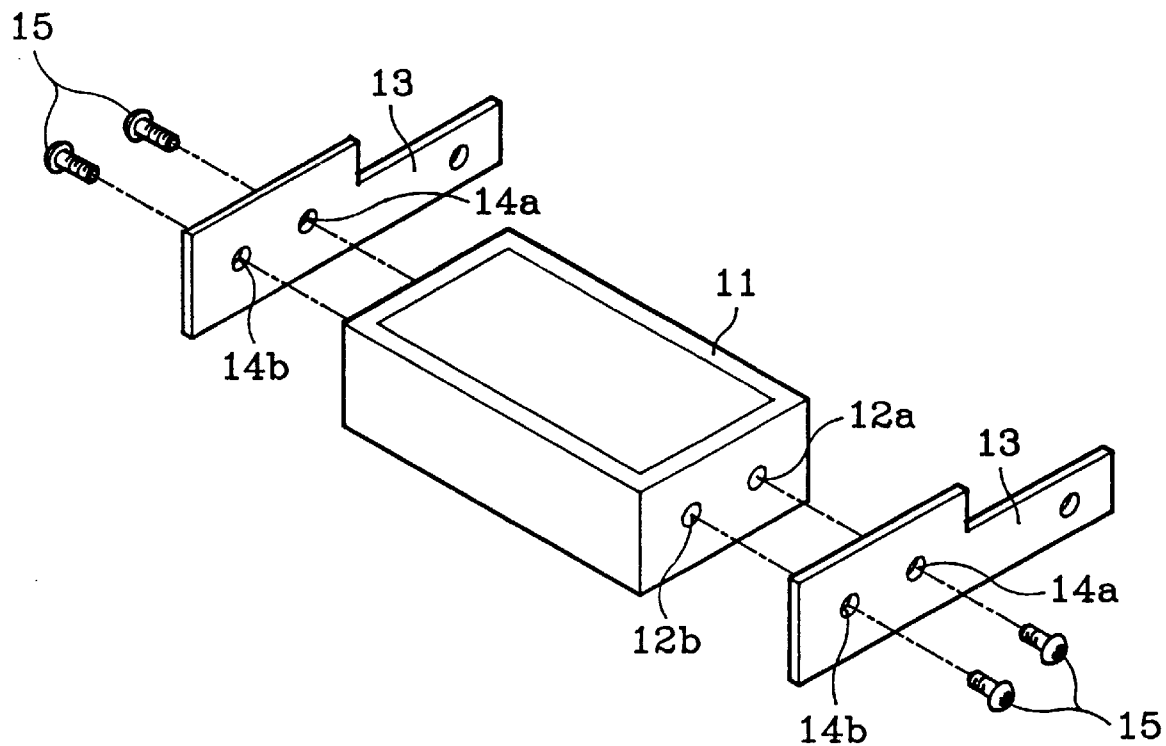
FIG. 1 is an exploded view showing a representation of a hypothetical earlier guide apparatus affixed to a contact image sensor.
Figure 2:
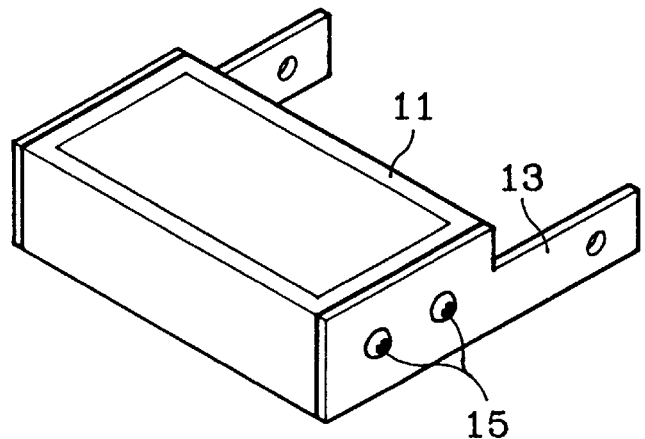
FIG. 2 is a view showing the earlier guide apparatus of FIG. 1 affixed to the contact image sensor.
Figure 3:
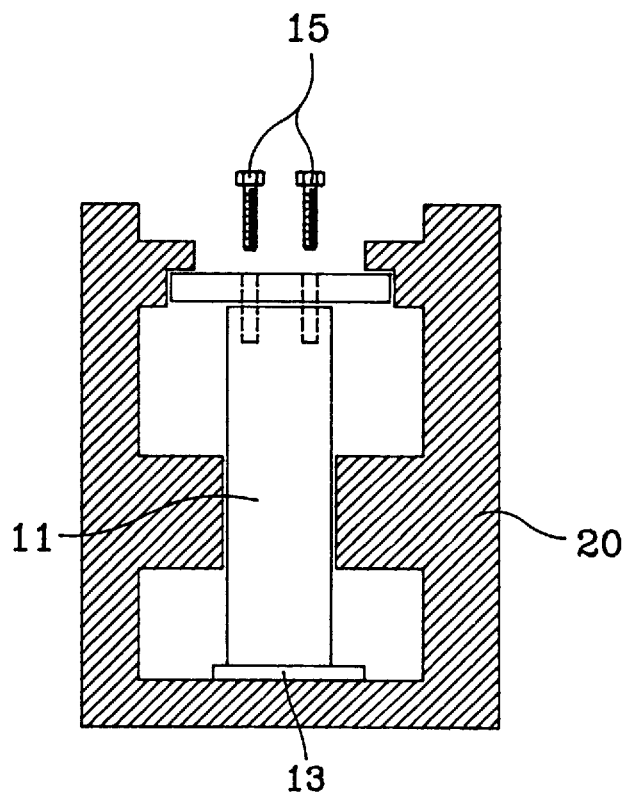
FIG. 3 is a view showing the earlier guide apparatus of FIG. 1 affixed to the contact image sensor using an auxiliary position fixing apparatus.

Turning now to the drawings, as shown in FIG. 1, bolt holes 12a and 12b are formed on both sides of a contact image sensor 11 so as to be spaced apart from each other, and holes 14a and 14b corresponding to bolt holes 12a and 12b are formed in each of a pair of guide apparatus 13 for fixing them to the contact image sensor 11. An auxiliary position fixing apparatus is employed to force bolt holes 12a and 12b formed on both sides of contact image sensor 11 to correspond to holes 14a and 14b formed in the pair of guide apparatus 13, and bolts 15 are screwed into bolt holes 12a and 12b of the contact image sensor 11 via holes 14a and 14b of the guide apparatus 13. Thereafter, the guide apparatus 13 on both sides of contact image sensor 11 are affixed to the inside of the main body of a facsimile machine for enabling the operation of the contact image sensor 11.

The contact image sensor 1 and guide apparatus 13 must be joined to each other by means of bolts 15 through bolt holes 12a and 12b of contact image sensor 11 and holes 14a and 14b of guide apparatus 13. For their accurate joining, the auxiliary position fixing apparatus is utilized to secure their positions prior to their joining.

Figure 4:
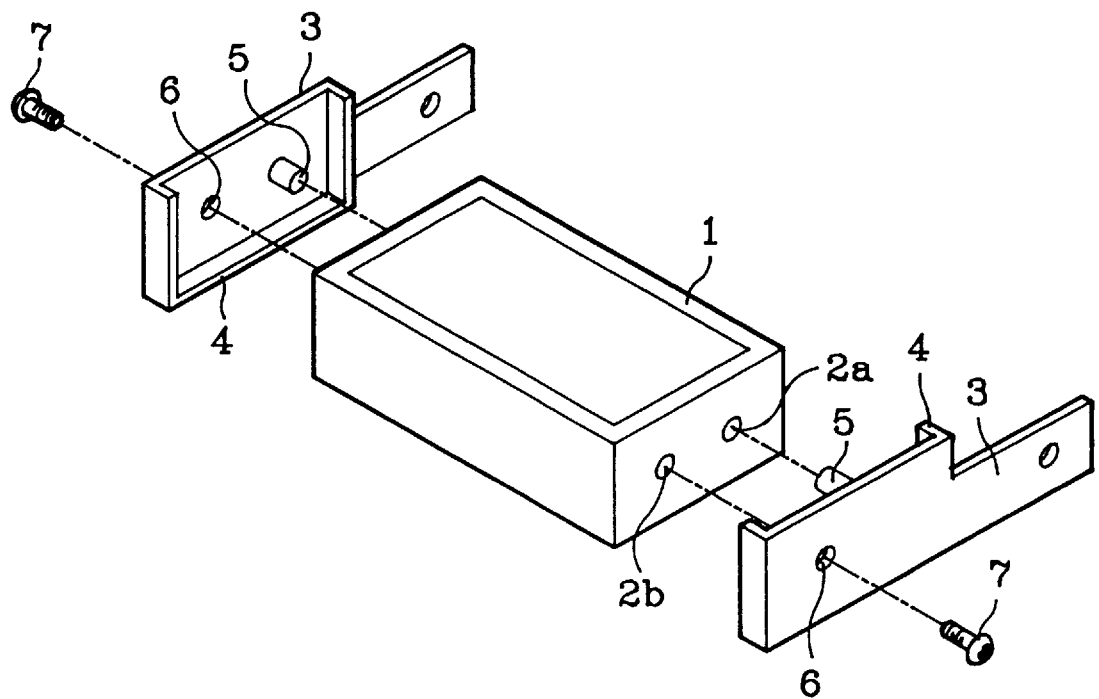
FIG. 4 is an exploded view showing a guide apparatus affixed to a contact image sensor according to the principles of the present invention.
Figure 5:
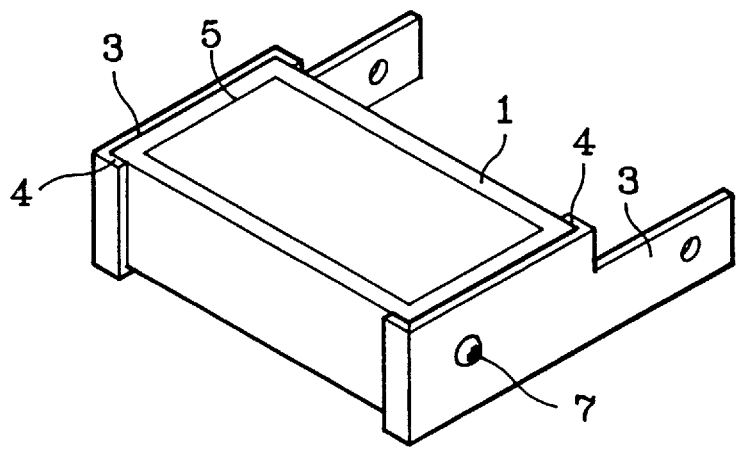
FIG. 5 is a view showing the contact image sensor affixed to the guide apparatus constructed according to the principles of the present invention.

Referring collectively to FIGS. 4 and 5, holes 2a and 2b are formed so as to be spaced apart from each other on both sides of the contact image sensor 1. Guide apparatus 3 respectively fixed to both sides of the contact image sensor 1 are formed with guide ribs 4 shaped in a rectangle having one side opened. Holes 6 are formed so as to be separated from fixing projections 5 on the inner center of the guide ribs 4. Each side of the contact image sensor 1 is inserted into a respective guide rib 4 of the guide apparatus 3, and each fixing, or indexing, projection 5 is inserted into a respective hole 2a on the side of the contact image sensor 1. Each hole 6 of the guide apparatus 3 is made to correspond to hole 2b on the side of the contact image sensor 1 so that they can readily receive a bolt 7 or other threaded fastener without obstructing insertion of that bolt.

For affixing guide apparatus 3 to both sides of the contact image sensor 1, the contact image sensor 1 is inserted into guide ribs 4 which are integrally provided on the inner side walls of the guide apparatus 3 and which are shaped into a rectangle having one side opened. Then, fixing projections 5 are inserted into holes 2a of the contact image sensor 1 in order to determine the position of the guide apparatus 3. Since the position of the contact image sensor 1 is fixed within the guide apparatus 3, the bolts 7 are screwed into the respective holes 2b of the contact image sensor 1 from the outside of the guide apparatus 3 via holes 6 of guide apparatus 3.

As described above, the respective guide apparatus 3 are joined to both sides of the contact image sensor 1.

As a result, the guide rib and fixing projection of the guide apparatus affix the guide apparatus via the holes which are spaced apart from each other and formed on the side of the contact image sensor. Thus, the position of the contact image sensor and guide apparatus is accurately and easily fixed, and the number of elements is decreased to facilitate shortening the assembling time.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A guide apparatus affixed to a contact image sensor, the guide apparatus comprising:

a guide rib in a form of a rectangle having one open side;

a fixing projection at an inner center of said rib; and a hole disposed in said inner center of said rib so as to be separated from said fixing projection;

wherein said contact image sensor includes two holes on a side surface thereof so as to be separated apart from each other, said side surface of said contact image sensor being engaged into an inner portion of said guide rib, said fixing projection being engaged into one of said two holes of said side surface of said contact image sensor, and said hole of said guide rib being immediately adjacent to the other of said holes on said side surface of said contact image sensor, so that said guide apparatus and said contact image sensor are fixedly assembled by a fastener engaging the other of the holes on said side surface of said contact image sensor after passing through said hole in said guide apparatus.

2. The guide apparatus recited in claim 1, said fastener comprising a threaded bolt having a threads corresponding to a threaded portion of the other of said two holes on said side surface of said contact image sensor.

3. A guide apparatus affixed to a side portion of an element, the guide apparatus comprising:

a guide rib having a form so as to partially enclose said side portion of said element;

a fixing projection at an inner center of said rib; and a hole disposed in said inner center of said rib so as to be separated from said fixing projection;

wherein said element includes two holes on said side portion surface thereof so as to be separated apart from each other, said side surface of said element being engaged into an inner porion of said guide rib, said fixing projection being engaged into one of said two holes of said side surface of said element, and said hole of said guide rib being immediately adjacent to the other of said two holes on said side surface of said element, so that said guide apparatus and said element are affixedly assembled by a fastener engaging the other of the holes on said side surface of said element after passing through said hole in said guide apparatus.

4. The guide apparatus as claimed in claim 3, said fastener comprising a threaded bolt having threads corresponding to a threaded portion of the other of said two holes on said side surface of said element.

* * * * *